W. F. KIRK.
KEYING DEVICE FOR ROLLS.
APPLICATION FILED SEPT. 16, 1911.
1,130,409.
Patented Mar. 2, 1915.
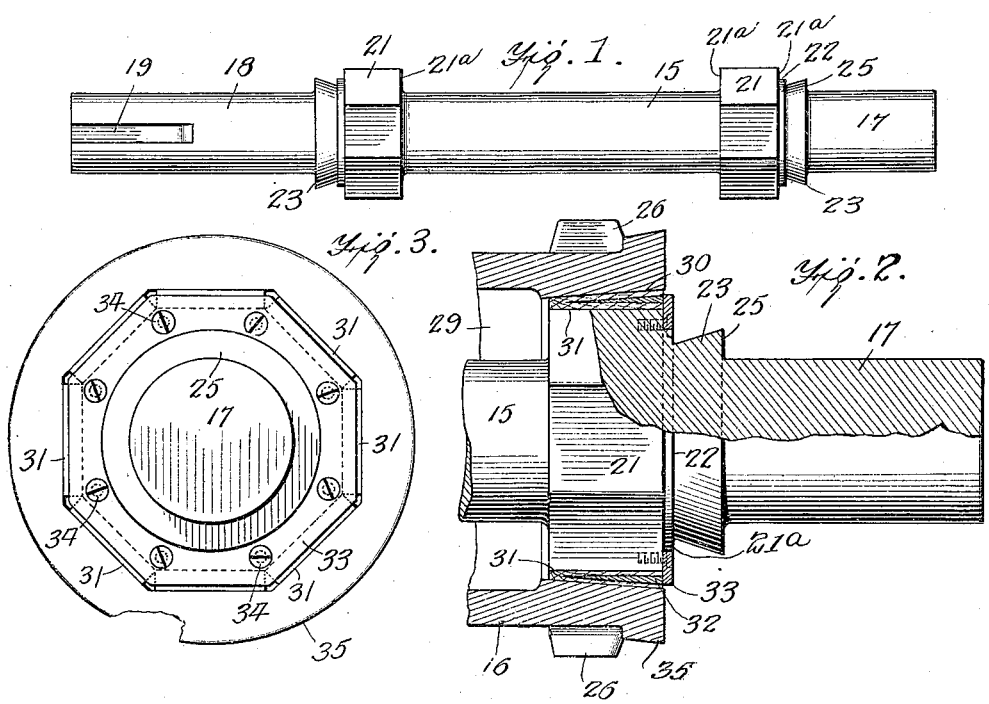
WITNESSES
INVENTOR
WILLIAM F. KIRK,
BY Munn & Co.
ATTORNEYS

UNITED STATES PATENT OFFICE.

WILLIAM F. KIRK, OF HOLLIDAYSBURG, PENNSYLVANIA.

KEYING DEVICE FOR ROLLS.

1,130,409.   Specification of Letters Patent.   Patented Mar. 2, 1915.

Application filed September 16, 1911. Serial No. 649,702.

*To all whom it may concern:*

Be it known that I, WILLIAM F. KIRK, a citizen of the United States, and a resident of Hollidaysburg, in the county of Blair, State of Pennsylvania, have invented a new and useful Improvement in Keying Devices for Rolls, of which the following is a specification.

My invention is an improvement in keying devices for rolls, and has for its object the provision of simple, cheaply constructed, speedy and powerful mechanism of the character specified, especially designed for crushing limestone, and having but one roll, coöperating with a fixed plate, and by means of which the stone may be crushed to varying degrees of fineness in accordance with the adjustment.

In the drawings: Figure 1 is a plan view of the shaft, Fig. 2 is an enlarged vertical section through one of the rolls with the shaft partly in section, and Fig. 3 is an enlarged end view of the roll.

The present embodiment of the invention is shown as connecting a crushing roll with its shaft. The shaft 15 is provided at each end with a bearing spindle 17 and 18, respectively, the spindles being journaled in suitable bearings, not shown, and the spindle 18 is extended beyond the bearing and is provided with a key way 19 for receiving a key to hold the gear wheel in place.

The shaft 15 is provided near each end with an annular rib or enlarged portion 21 between the spindle and the shaft, and the said ribs or enlargements are octagonal in the present instance. The shaft is provided with a shoulder 21ª at each end of the ribs 21, and outside of each of the said ribs an annular enlargement or collar 22 is arranged. Outside of the collars 22 the shaft is provided with a frusto-conical portion 23, having its small end inward, and an annular shoulder 25 is formed at the large end between the said portion and the adjacent spindle. The shaft, spindles, ribs 21 and portions 22 and 23 are integral, the shaft being turned to the shape described.

The roller 16 consists of a shell, cylindrical in form, and provided on its peripheral surface with teeth 26. The shell is of greater internal diameter than the shaft, so that an annular space or chamber 29 is formed between the shell and shaft, and the ends of the bore of the shell are reduced, as indicated at 30, and are octagonal in cross section, that is, the said ends have a cross section corresponding to that of the ribs 21 of the shaft. The said reduced ends of the bore are of greater size than the ribs 21 fitting loosely thereon, and they are also tapering, that is, they increase gradually in cross section from within outward. Wedge-shaped blocks 31 of wood or like material are inserted between the faces of the ribs 21 and the faces of the reduced ends to hold the shell in proper position on the shaft. A wedge-shaped plate 32, preferably of steel, is inserted in each block, and the blocks and plates are held in place by means of rings or collars 33. Each collar 33 is seated on a portion 22 of the shaft, and the said rings or collars are held in place by screws 34 passing through the collars and engaging the outermost shoulder 21ª. Each of the rings or collars has its inner edge circular, while the outer is polygonal, as shown in Fig. 3. The portions 22 of the shaft are of sufficient diameter to permit the collars to be slipped over the portions 23, and the shoulders 25 of the said portions space the shaft properly in the bearings. The shell 16 is also provided with an annular rib or flange 35 at each end.

I claim:

1. In combination, a shaft provided near each end with an enlarged portion polygonal in cross section, and with an annular shoulder at the outer end of each of the said portions, a shell having each end of its bore of a cross section similar to the enlarged portion of the shaft to fit said portions loosely, said ends of the bore of the shell tapering from without inward, a wooden wedge between each of the adjacent faces of the shell and shaft, a metallic wedge inserted in each of the wooden wedges, a ring on each of the annular shoulders, and screws passing through the ring and engaging with the enlarged portion of the shaft, said shaft having a frusto-conical enlargement at the outer side of each shoulder.

2. In combination, a shaft provided near each end with an enlarged portion polygonal in cross section, and with an annular shoulder at the outer end of each of the said portions, a shell having each end of its bore of a cross section similar to the enlarged portion of the shaft to fit said portions loosely, said ends of the bore of the shell tapering from without inward, a wooden wedge between each of the adjacent faces of the shell and shaft, a metallic wedge inserted in each of the wooden wedges, a ring on each of the annular shoulders, and screws passing through the ring and engaging with the enlarged portion of the shaft.

3. In combination, a shaft provided near each end with an enlarged portion polygonal in cross section, and with an annular shoulder at the outer end of each of the said portions, a shell having each end of its bore of a cross section similar to the enlarged portion of the shaft to fit said portions loosely, said ends of the bore of the shell tapering from without inward, a wooden wedge between each of the adjacent faces of the shell and shaft, a metallic wedge inserted in each of the wooden wedges, and a ring secured to the shell at each end, said ring resting on the annular shoulder.

4. In combination, a shaft provided near each end with an enlarged portion polygonal in cross section, and with an annular shoulder at the outer end of each of the said portions, a shell having each end of its bore of a cross section similar to the enlarged portion of the shaft to fit said portions loosely, said ends of the bore of the shell tapering from without inward, a wooden wedge between each of the adjacent faces of the shell and shaft, a metallic wedge inserted in each of the wooden wedges, and means for holding the wedges in place.

5. In combination, a shaft provided near each end with an enlarged portion polygonal in cross section, and with an annular shoulder at the outer end of each of the said portions, a shell having each end of its bore of a cross section similar to the enlarged portion of the shaft to fit said portions loosely, said ends of the bore of the shell tapering from without inward, a wooden wedge between each of the adjacent faces of the shell and shaft, and a metallic wedge inserted in each of the wooden wedges.

WILLIAM F. KIRK.

Witnesses:
JOHN T. AKERS,
T. B. McFARLAND,
S. R. VAN ALLMAN.

Copies of this patent may be obtained for five cents each, by addressing the "Commissioner of Patents, Washington, D. C."